No. 694,348. Patented Mar. 4, 1902.
G. C. CARSON.
APPARATUS FOR TREATING METALS.
(Application filed Apr. 12, 1901.)
(No Model.)
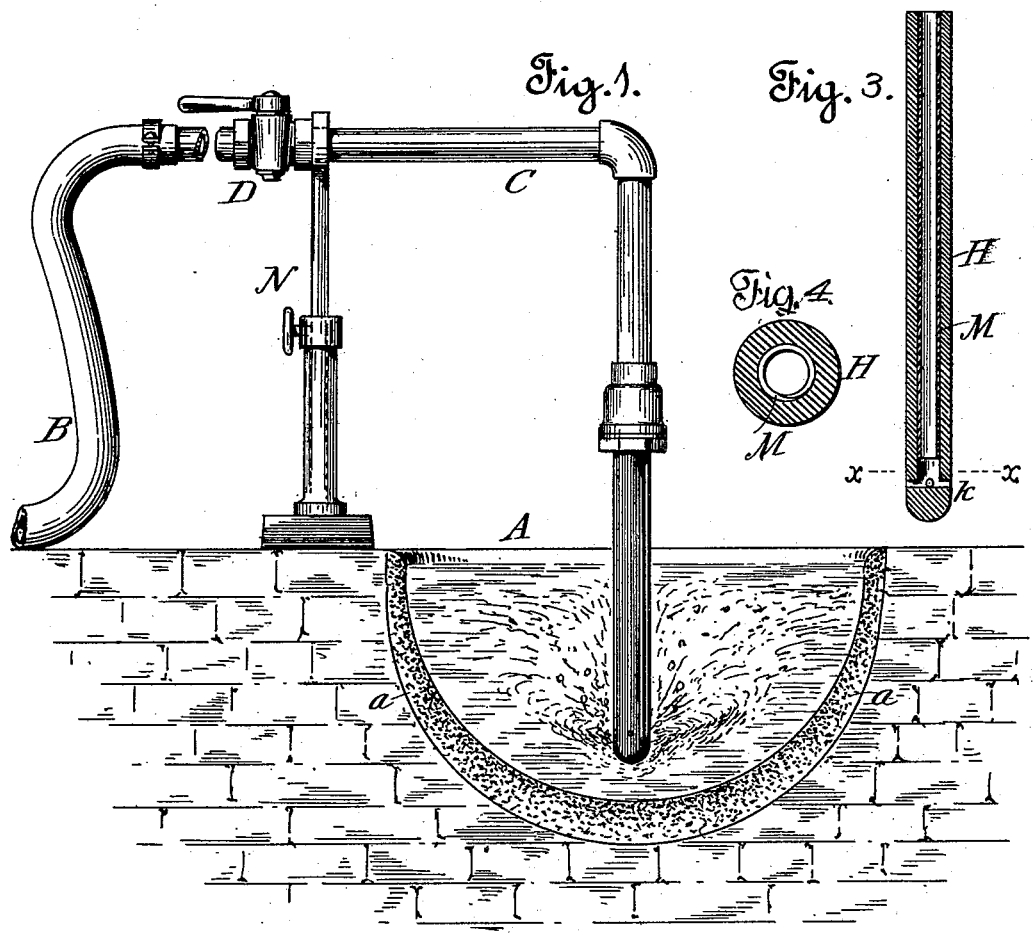
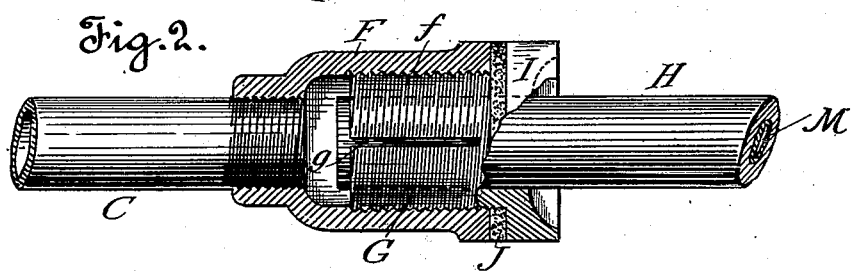
Witnesses.
Inventor.
George C. Carson
by Spear & Sealy
Attorneys

UNITED STATES PATENT OFFICE.

GEORGE C. CARSON, OF REDDING, CALIFORNIA.

APPARATUS FOR TREATING METALS.

SPECIFICATION forming part of Letters Patent No. 694,348, dated March 4, 1902.

Application filed April 12, 1901. Serial No. 55,481. (No model.)

*To all whom it may concern:*

Be it known that I, GEORGE C. CARSON, a citizen of the United States, residing at Redding, in the county of Shasta and State of California, have invented certain new and useful Improvements in Apparatus for Treating Metals, of which the following is a specification.

My invention relates to the treatment of metals, either to reduce them to a molten condition or to refine metals and mattes already molten.

The object of my invention is to provide a cheap and simple apparatus of a portable nature which will enable the conversion and refining of metals to be carried on without expensive plants, and so, for instance, to put the making of malleable iron and steel and the refining of copper and other mattes within the reach of people of limited means, such as the owners of small foundries or smelting plants.

My invention comprises a novel construction of blowpipe for introducing into the metal the jets, streams, or currents of steam, air, gases, or vapors of any kind for melting, or for producing chemical changes in molten metal.

In the accompanying drawing, Figure 1 is a general view of such a blowpipe supported in operative relation to a receptacle containing molten metal. Fig. 2 is a section of the holder for the carbon tube. Fig. 3 is a longitudinal section showing a modification of the same. Fig. 4 is a cross-section of the same at $x\,x$, Fig. 3, looking upwardly.

The receptacle A, lined with refractory material $a$, is illustrative of many different kinds of hearths, crucibles, melting-pots, pits, and receptacles generally in which scrap or other forms of metal can be melted or in which previously molten metal can be treated.

B represents a hose which leads to any suitable supply from which the current for reducing or for oxidizing is derived. This hose is coupled to a pipe C, having a right-angled turn, as shown, or, if desired, such pipe can be formed into a coil instead of an angle, so as to provide some additional heating-surface, which can derive heat from the receptacle below. A cock D regulates the current. Upon the end of the pipe C is threaded the sleeve F, made, preferably, of iron and provided with an internal screw-thread $f$. Engaging with this thread is an expansive bushing G, made of metal having greater expansion than that of the external sleeve, such as brass, and having one or more incisions $g$, and having also a head I, by which the bushing may be turned. This expansive bushing is the holder for the blowpipe or jet H, which is preferably a hollow tube of hard carbon, projecting from the holder down into the contents of the metal receptacle. When the head I is turned to screw in the bushing, it compresses a ring or washer J, of asbestos or other suitable material, between itself and the end of the sleeve F, which makes a tight joint. The carbon-jet pipe is of sufficient diameter to provide for a central bore for the passage of the current. I prefer to terminate this bore short of the end of the carbon and then provide two or more intersecting passages $k\,k$ for discharging the current sidewise. The bore may, however, continue through to the end, if desired. In Figs. 3 and 4 a sleeve M, of metal, is inserted in the hollow carbon, terminating short of the end of the bore therein, and is split and lapped, so that it can expand without affecting the carbon.

In operation the carbon jet is inserted into the metal and the reducing-current or oxidizing-current is forced under pressure through the hose. I prefer to use a simple adjustable support N for the apparatus and with a single receptacle can employ one, two, or as many of my blowpipes as may be required. By a reducing-current of hydrocarbon vapor a melting heat can be obtained in the receptacle for melting scrap, &c., or for raising the temperature of metal previously melted. An oxidizing-current of air or steam is used to expel impurities in the molten metal and in transforming cast-iron into malleable iron or steel. The carbon jet is peculiarly adapted to the purpose on account of its exceedingly refractory nature and slight range of expansion.

The carbon-holder shown is very simple in construction, and the replacing of carbon tubes is accomplished with great facility. The great expansion of the split metal sleeve as compared to the carbon causes it to clamp the carbon more firmly as the temperature increases, while the packed joint shown prevents any leakage of air, steam, or vapors.

Having thus fully described my invention, what I claim as new, and desire to secure by Letters Patent, is—

A blowpipe or jet composed of hollow carbon having an internal sleeve split and lapped, and forming a reinforcement for said carbon.

In testimony whereof I have affixed my signature, in presence of two witnesses, this 25th day of March, 1901.

GEO. C. CARSON.

Witnesses:
L. W. SEELY,
F. M. BURT.